United States Patent Office 3,303,152
Patented Feb. 7, 1967

3,303,152
POLYETHYLENE OF IMPROVED ENVIRONMENTAL STRESS CRACKING RESISTANCE
Wildon T. Harvey, Hockessin, Del., assignor to Sun Oil Company, Philadelphia, Pa., a corporation of New Jersey
No Drawing. Filed July 31, 1964, Ser. No. 386,740
6 Claims. (Cl. 260—28.5)

This invention relates to polyethylene having improved environmental stress cracking resistance (ESCR), the improvement being due to the incorporation in the polyethylene of a minor amount of a certain type of wax. In another aspect the invention relates to a method of improving the ESCR of polyethylene. The invention also embraces a method of making a container for liquids which container has improved properties.

Many liquids such as bleach, detergents, etc. are conventionally packaged in polyethylene containers. Unfortunately, in such service polyethylene often develops small cracks resulting in the loss of the liquid and the various undesirable consequences incident to such loss. The tendency of polyethylene to crack when exposed to liquids is conventionally referred to as the environmental stress cracking resistance of the polyethylene and the ESCR is conventionally determined by ASTM D-1693 described hereinafter. Various techniques have been proposed heretofore for improving the ESCR of polyethylene; some of these techniques have proven satisfactory and other have not. The present invention relates, inter alia, to novel polyethylene compositions having improved ESCR.

According to the invention the ESCR of polyethylene is improved by incorporating into same a minor amount of paraffin wax having certain properties. Although most paraffin and other waxes do not improve the ESCR of polyethylene, it has now been found that paraffin wax having certain specific properties is effective to improve the ESCR of polyethylene. Therefore, although the prior art has recognized that paraffin waxes generally can be added to polyethylene (see, e.g., U.S. Patent 3,030,322), the prior art has not recognized the specific type of paraffin wax which alone will improve the ESCR of polyethylene.

The present invention is applicable to any type of polyethylene. However, since the ESCR is of major importance when the polyethylene is to be used in making containers for liquids, i.e., bottles, the invention is most applicable to the types of polyethylene used in making polyethylene bottles. The most important properties of such polyethylene are its melt index and density. Since such bottles are normally made by blow molding the polyethylene will usually have a low melt index. Normally the melt index will be in the range of 0.1–10.0 (ASTM D-1238) and is preferably in the range of 0.1–5.0. Although the invention is applicable to low density (0.91–0.924 gms./cc., ASTM D-792), medium density (0.924–0.94 gms./cc.), or high density (0.94–0.97 gms./cc.) polyethylene, it will be most applicable to high density polyethylene since this type is normally used in the manufacture of polyethylene bottles. Although the ESCR of polyethylene decreases as the density increases, bottle manufacturers nevertheless use the high density material because of its greater stiffness. The polyethylene used in the manufacture of bottles normally has a molecular weight in the range of 10,000 to 100,000 but this physical property is not nearly as critical as melt index and density.

The amount of wax incorporated into the polyethylene to improve the ESCR of the latter should be a minor amount, i.e., less than 50%, based on the total composition, the latter being the wax plus the polyethylene. All percentages and amounts herein are by weight. In addition, the amount of wax should be at least 13% since below this amount a significant improvement in ESCR is not obtained. This is shown more clearly in the subsequent examples. Preferably the amount of wax used is 15–30%. In all cases, of course, the amount of wax employed should be sufficient to improve the polyethylene ESCR.

As mentioned above the wax suitable for the present purpose must have certain physical properties. These properties are critical and if the wax employed does not have the specified properties there is no improvement in the ESCR of the polyethylene. The wax suitable for the present purpose is a paraffin wax having a melting point of 122°–130° F. (ASTM D-87), a penetration at 77° F. of 9–35 dmm. (ASTM D-1321), a viscosity at 210° F. of 36–45 S.U.S. (ASTM D-446), and an oil content of less than 0.5% (ASTM D-721).

A paraffin wax having properties as specified can be prepared by the following methods. One procedure involves distillation of a slack wax obtained as a by-product from the dewaxing of lubricating oils and which contains about 30% oil to separate a distillate fraction boiling mainly throughout the range of 650°–1025° F. at 1 atmosphere pressure. All boiling points herein are at 1 atmosphere pressure. This distillate fraction is dissolved in a dewaxing solvent at an elevated temperature of, say, about 150° to 200° F., the dewaxing solvent preferably being a mixture of 37 volumes benzene and 63 volumes methyl ethyl ketone (MEK) and the ratio of the benzene-MEK dewaxing solvent to distillate fraction preferably being about 1.8:1 by volume. The resulting solution is then cooled to a temperature in the range of 82° to 87° F. and the resulting precipitated wax is separated by, say, filtration. The filtrate is then preferably diluted with an additional 2.2 volumes of benzene-MEK dewaxing solvent per volume of distillate fraction initially treated so that the total amount of solvent present is 4 volumes per volume of distillate fraction initially treated. The diluted filtrate is then cooled to 22°–27° F. and the precipitated wax separated by, say, filtration. This precipitated wax is next washed with an additional quantity of solvent of the same type used previously in order to reduce the oil content of the wax to less than 0.5%. The washing is preferably conducted at 22°–27° F., i.e., the same temperature at which the wax is separated. The washed wax is a paraffin wax having a melting point of 123°–129° F., a penetration at 77° F. of 15–23 dmm., a viscosity at 210° F. of 37–41, and an oil content of less than 0.5%. A wax prepared in the manner described, which wax will therefore have the properties recited, is referred to hereinafter as Wax 1. The only qualification to this is that as hereinafter described other dewaxing solvents can be used and the identical wax still be obtained.

As stated above the preferred dewaxing solvent is a mixture containing 37 volumes benzene and 63 volumes MEK. This benzene:MEK volume ratio of 0.59:1 is not critical and can be as high as, say, 8:1 or as low as, say, 1:8. Similarly it is not necessary that the dewaxing solvent be a benzene-MEK mixture because other conventional dewaxing solvents can also be employed, examples of which are ketones such as MEK, acetone, methyl butyl ketone; hydrocarbons or halogenated hydrocarbons such as pentane, hexane, ethylene dichloride, etc.; and alcohols such as propyl or heptyl alcohol; and mixtures of any of the foregoing. However, the temperature ranges of 82°–87° F. and 22°–27° F. specified above are for use in conjunction with a benzene-MEK dewaxing solvent wherein the volume ratio of benzene to MEK is 37:63. Other solvents (which includes other benzene-MEK mixtures) exhibit a different solvency for the wax, i.e., the wax precipitates from different solvents at different temperatures. For example, increasing the proportion of MEK in a benzene-MEK dewaxing solvent increases the temperature at which the wax precipitates. Thus in preparing Wax 1 if a benzene:MEK ratio of 1:1 is used instead of a ratio of 0.59:1 as in the above description, the initial cooling should be to a temperature of 75°–80° F. instead of 82°–87° F. However, one skilled in the art can readily determine the proper temperature ranges to which the distillate fraction should be cooled, in the event a solvent other than a 37:63 mixture of benzene and MEK is employed, so that the precipitated wax is the same as the wax which precipitates when the preferred solvent is used in conjunction with the temperature ranges stated above.

The ratio of dewaxing solvent to distillate fraction in the above description is 1.8:1 in the first cooling step and 4:1 in the second cooling step. These ratios are not critical because the dewaxing solvent:distillate fraction ratio determines only the amount of wax precipitated and not the type of wax precipitated. The ratio usually employed is such that the slurry of precipitated wax can be pumped, etc., without difficulty, i.e., so that slurry is readily handleable. The optimum ratio will usually vary somewhat depending upon the specific dewaxing solvent employed.

A wax suitable for the present purpose can also be prepared by a procedure essentially the same as that described above for Wax 1 except for the boiling range of the distillation fraction. In this second procedure the slack wax is distilled to separate a fraction boiling mainly throughout the range of 800° to 1025° F. This fraction is then dissolved in 1.8 volumes of a benzene-MEK mixture per volume of distillate fraction, the benzene:MEK volume ratio being 37:63. The solution is cooled to 82°–87° F., the precipitated wax is filtered off, and the filtrate is diluted with additional benzene:MEK so that the total amount of solvent present is 4 volumes per original volume of distillate fraction. The diluted filtrate is cooled to 22°–27° F., the precipitated wax is separated, and is then washed with additional solvent until the oil content of the wax is less than 0.5%. As in the previous discussion the specified temperature ranges are for use with the preferred dewaxing solvent but the equivalent ranges for other dewaxing solvents can be easily determined by one skilled in the art. The washed wax is a paraffin wax having a melting point of 122°–128° F., a penetration at 77° F. of 28–35 dmm., a viscosity at 210° F. of 42–45 S.U.S. and an oil content of less than 0.5%. A wax prepared in the manner just described, subject to the use of other dewaxing solvents, which wax will therefore have the properties recited, is referred to hereinafter as Wax 2.

In a third method of preparing a wax suitable for the present purpose the slack wax is distilled to separate a distillate fraction boiling mainly throughout the range of 650° to 875° F. This distillate fraction is dissolved at, say, 150° to 200° F., in a dewaxing solvent, preferably a benzene-MEK mixture with the benzene:MEK volume ratio being 37:63. The volume ratio of solvent to distillate fraction is preferably 5.5:1. The resulting solution is cooled to 25°–30° F., the precipitated wax is separated and is then washed with solvent, preferably at 25°–30° F., to reduce its oil content to less than 0.5%. As in the previous discussions the specified temperature ranges are for use with the preferred dewaxing solvent but the equivalent ranges for other dewaxing solvents can be readily determined by one skilled in the art. The washed wax is a paraffin wax having a melting point of 123°–130° F., a penetration at 77° F. of 9–15 dmm., a viscosity at 210° F. of 36–39 S.U.S., and an oil content of less than 0.5%. A wax prepared in the manner just described, subject to the use of other dewaxing solvents, which wax will therefore have the properties recited, is referred to hereinafter as Wax 3. The preferred paraffin waxes for the present purpose are Waxes 1, 2, and 3 as above described.

The wax-polyethylene compositions of the invention are substantially homogeneous blends of wax and polyethylene. They can be prepared in any convenient manner, one suitable procedure being shown in the subsequent examples.

The following examples specifically illustrate the invention. In all the examples the compositions are prepared in essentially the same manner as follows.

The polyethylene is charged to a sigma blade mixer of 1000 grams capacity equipped with heating and cooling means. The polyethylene is heated until it is a viscous, semi-fluid mass after which solid wax is then added. The wax quickly melts and mixing is continued until the wax-polyethylene mass appears homogeneous. The mass is then cooled to 100°–110° F. with mixing continuing during the cooling period. The cooled blend is a powdery mass in the case of low density polyethylene and a stringy, lumpy mass in the case of medium and high density polyethylene. The stringy, lumpy mass is then powdered in a Waring Blendor.

The blend is next extruded through a ⅛ inch hole into rods which are then cut in pellets about ⅛ inch long. The extrusion operation is at 250°–500° F., the exact temperature depending upon the polyethylene density and the amount of wax in the blend. As the density increases the extrusion temperature increases and as the amount of wax increases the extrusion temperature decreases.

The pellets are then injection molded in a ¾ oz. shot Unex Queen injection molder into a plurality of tensile bars having dimensions in accordance with the tensile bar specifications stated in A.S.T.M. D–638 (Type I, 0.125″ thick). From the center of each tensile bar is cut a specimen ⅛″ x 1½″ x ½″, i.e., the size specified in A.S.T.M. D–1693, Environmental Stress Cracking of Type I Ethylene Plastics. Each stress cracking test requires 10 such specimens. In conducting the stress cracking test the specimens are first heated in boiling water to remove "frozen in" stresses. A surface cut of specified length and depth is then made on the sample parallel to the long axis thereof with a mounted razor blade. The specimens are then stressed by bending them 180° so that the surface cut is on the convex surface. The bent specimens are placed in a rack in the bent position, and the rack is immersed in a test tube containing Igepal CO–630, an alkyl aryl polyethylene glycol marketed by General Dyestuff Corp. The test tube is then placed in a 50° C. constant temperature bath. At short periodic intervals thereafter the specimens are inspected for visual cracks perpendicular to the cuts. Such a crack means that that particular specimen fails and the composition under test fails when 5 of the 10 specimens fail. The quantitative measure of the ESCR of a composition is the elapsed hours until failure of the composition.

*Example I*

This example shows the effect of incorporating Wax 1 into two commercially available low density polyethylenes. Wax 1 is as described hereinbefore and is prepared as described hereinbefore using the preferred dewaxing solvent. Wax 1 has a melting point of 126° F., a penetration at 77° F. of 18 dmm. and a viscosity at 210° F. of 39 S.U.S. The density (Den.), melt index (M.I.), trade name, and manufacturer of the polyethylenes used are as shown in Table I below along with the amount of Wax 1 used and the ESCR of the compositions.

Times marked with an asterisk mean that failure has not occurred at the stated time. The amount of Wax 1 is by weight of the total composition.

TABLE I

| Composition | Amount of Wax 1, Percent | Polyethylene | | | ESCR (Hrs. to Failure) |
|---|---|---|---|---|---|
| | | Den. | M.I. | Type | |
| 1 | None | 0.917 | 1.9 | DYNH-3 [1] | 0.5 |
| 2 | 15 | 0.917 | 1.9 | ___do.[1] | 72 |
| 3 | None | 0.917 | 2.0 | Dylan 1020 [2] | 15 |
| 4 | 5 | 0.917 | 2.0 | ___do.[2] | 12 |
| 5 | 10 | 0.917 | 2.0 | ___do.[2] | 23 |
| 6 | 15 | 0.917 | 2.0 | ___do.[2] | *712 |
| 7 | 20 | 0.917 | 2.0 | ___do.[2] | *712 |

[1] Union Carbide.  [2] Koppers Co.

The data in Table I show that in sufficient amount Wax 1 distinctly improves the ESCR of polyethylene. The data also show that although 10% Wax 1 is not enough to effect this improvement 15% is adequate. The exact amount required is about 13%. When other paraffin waxes having the properties specified herein for a wax suitable for the present purpose are used instead of Wax 1 substantially the same results are obtained.

*Example II*

This example is 2 compositions the same as Composition 6 in Table I except that Waxes 2 and 3 as described hereinbefore are used instead of Wax 1. Waxes 2 and 3 are prepared as described herein using the preferred dewaxing solvent and have the following properties.

| | Melt Point, °F. | Pen. at 77° F. (dmm.) | Vis. at 210° F. (S.U.S.) |
|---|---|---|---|
| Wax 2 | 125 | 31 | 43.5 |
| Wax 3 | 126 | 12 | 38.0 |

The ESCR of these two compositions, along with some pertinent data from Table I above, is shown in Table II below.

TABLE II

| Composition | Wax | | Polyethylene | | | ESCR (Hours to Failure) |
|---|---|---|---|---|---|---|
| | Amt., Percent | No. | Den. | M.I. | Type | |
| 3 | None | None | 0.917 | 2.0 | Dylan 1020 [1] | 15 |
| 6 | 15 | 1 | 0.917 | 2.0 | ___do.[1] | *712 |
| 8 | 15 | 2 | 0.917 | 2.0 | ___do.[1] | *712 |
| 9 | 15 | 3 | 0.917 | 2.0 | ___do.[1] | *712 |

[1] Koppers Co.

The data contained in Table II show that Waxes 2 and 3 are effective to improve the ESCR of polyethylene. When other paraffin waxes having the properties specified herein for a wax suitable for the present purpose are used instead of Waxes 2 and 3 substantially the same results are obtained.

*Example III*

This example is 9 compositions showing the improvement in ESCR of medium and high density polyethylene which can be effected by incorporating Wax 1 or 3 in same. Waxes 1 and 3 are prepared as in the prior examples. The compositions and the ESCR thereof are as shown in Table III below.

TABLE III

| Composition | Wax | | Polyethylene | | | ESCR (Hours to Failure) |
|---|---|---|---|---|---|---|
| | Amt., Percent | No. | Den. | M.I. | Type | |
| 10 | None | None | 0.926 | 4.0 | Dylan 4042 [1] | 42 |
| 11 | 15 | 1 | 0.926 | 4.0 | ___do.[1] | 338 |
| 12 | 15 | 3 | 0.926 | 4.0 | ___do.[1] | 338 |
| 13 | None | None | 0.95 | 0.9 | Hifax 2400-E [2] | 21 |
| 14 | 15 | 1 | 0.95 | 0.9 | ___do.[2] | 146 |
| 15 | 15 | 3 | 0.95 | 0.9 | ___do.[2] | 146 |
| 16 | None | None | 0.95 | 0.9 | Marlex 6009 [3] | 21 |
| 17 | 15 | 1 | 0.95 | 0.9 | ___do.[3] | 146 |
| 18 | 15 | 3 | 0.95 | 0.9 | ___do.[3] | 146 |

[1] Koppers Co.  [2] Hercules Powder Co.  [3] Phillips Petroleum.

The data in Table III show that Waxes 1 and 3 are effective to improve the ESCR of medium and high density polyethylene. When other paraffin waxes having the properties specified herein for a wax suitable for the present purpose are used instead of Waxes 1 and 3 substantially the same results are obtained.

*Example IV*

This example shows that the incorporation of waxes other than those specified herein in polyethylene does not result in an improvement in the ESCR of the polyethylene. In this example Waxes 4, 5, 6, and 7 are each incorporated into polyethylene. Wax 4 is a microcrystalline wax and Waxes 5, 6, and 7 are paraffin waxes. The properties of these waxes are as follows:

| Wax | Melt Point, °F. | Pen. at 77° F. (dmm.) | Vis. at 210° F. (S.U.S.) |
|---|---|---|---|
| 4 (Micro) | 151 | 21 | 72 |
| 5 (Paraffin) | 134 | 10 | 38.1 |
| 6 (Paraffin) | 142 | 9 | 40.0 |
| 7 (Paraffin) | 153 | 9 | 44.8 |

The ESCR of the polyethylene compositions containing Waxes 4-7 is shown in Table IV below along with the ESCR of the polyethylene containing no wax.

TABLE IV

| Composition | Wax | | Polyethylene | | | ESCR (Hours to Failure) |
|---|---|---|---|---|---|---|
| | Amt., Percent | No. | Den. | M.I. | Type | |
| 19 | None | None | 0.917 | 1.9 | DYNH-3 [1] | 0.5 |
| 20 | 15 | 4 | 0.917 | 1.9 | do. [1] | 0.1 |
| 21 | 15 | 5 | 0.917 | 1.9 | do. [1] | 0 [1] |
| 22 | 15 | 6 | 0.917 | 1.9 | do. [1] | 0.5 |
| 23 | 15 | 7 | 0.917 | 1.9 | do. [1] | 0.03 |

[1] Union Carbide.

It is apparent from the data contained in Table IV that Waxes 4-7 are ineffective to improve the ESCR of polyethylene. An improvement in ESCR is obtained only with a paraffin wax having properties as specified herein.

The invention claimed is:

1. A polyethylene composition of improved environmental stress cracking resistance, said composition comprising a major amount of polyethylene and a minor amount, at least 13% and sufficient to improve the environmental stress cracking resistance of said polyethylene, of a paraffin wax having a melting point of 122°–130° F., a penetration at 77° F. of 9–35 dmm., a viscosity at 210° F. of 36–45 S.U.S., and an oil content of less than 0.5%.

2. Composition according to claim 1 wherein the amount of said wax is 13–30%.

3. Composition according to claim 1 wherein said paraffin wax has a melting point of 123°–129° F., a penetration at 77° F. of 15–23 dmm., a viscosity at 210° F. of 37–41 S.U.S., and an oil content of less than 0.5%.

4. Composition according to claim 1 wherein said paraffin wax has a melting point of 122°–128° F., a penetration at 77° F. of 28–35 dmm., a viscosity at 210° F. of 42–45 S.U.S., and an oil content of less than 0.5%.

5. Composition according to claim 1 wherein said paraffin wax has a melting point of 123°–130° F., a penetration at 77° F. of 9–15 dmm., a viscosity at 210° F. of 36–39 S.U.S., and an oil content of less than 0.5%.

6. A method of reducing the tendency of polyethylene containers to undergo environmental stress cracking which comprises incorporating a minor amount, at least 13%, of a wax composition according to claim 1 into polyethylene and then forming a container for liquids from the resulting wax-polyethylene composition.

References Cited by the Examiner

UNITED STATES PATENTS 2,504,270  4/1950  MacLaren.
2,523,705  9/1950  Lovell et al.
3,030,322  4/1962  Schraeder.

MORRIS LIEBMAN, *Primary Examiner.*